United States Patent [19]

Lacomme

[11] 4,331,958

[45] May 25, 1982

[54] PROCESSING DEVICE FOR ANGULAR DEVIATION MEASUREMENT SIGNALS OF A MONOPULSE RADAR

[75] Inventor: Philippe Lacomme, Paris, France

[73] Assignee: Thomson-CSF, Paris, France

[21] Appl. No.: 133,884

[22] Filed: Mar. 25, 1980

[30] Foreign Application Priority Data

Mar. 30, 1979 [FR] France ................................ 79 08094

[51] Int. Cl.³ .............................................. G01S 13/44
[52] U.S. Cl. .............................. 343/16 M; 343/5 NQ
[58] Field of Search ........................... 343/16 M, 5 NQ

[56] References Cited

U.S. PATENT DOCUMENTS

| | | | |
|---|---|---|---|
| 3,890,617 | 6/1975 | Moulton | 343/16 M X |
| 3,958,242 | 5/1976 | Sirven | 343/16 M X |
| 4,084,160 | 4/1978 | Leuenberger et al. | 343/16 M |
| 4,168,501 | 9/1979 | Brassaw | 343/16 M X |
| 4,220,953 | 9/1980 | Carre | 343/16 M |

OTHER PUBLICATIONS

S. Sherman, *Complex Indicated Angles Applied to Unresolved Radar Targets and Multipath;* IEEE Transactions on Aerospace & Electronic Systems; vol. AES-7, No. 1, Jan. 1971, pp. 160-170.

P. R. Dax, *Accurate Tracking of Low Elevation Targets Over the Sea with a Monopulse Radar,* 'International Conference on Radar-Present and Future, Institution of Electrical Engineers, Oct. 1973, pp. 160-165.

*Primary Examiner*—T. H. Tubbesing
*Attorney, Agent, or Firm*—Karl F. Ross

[57] ABSTRACT

In order to determine the angular offset of the direction of a target tracked by a monopulse radar from the boresight axis of the radar antenna, sum and difference vectors $\Sigma$ and $\Delta$ represented by intermediate-frequency signals derived from incoming echo pulses are algebraically combined to form two ancillary vectors $\gamma = \Sigma + jp\Delta$ and $\epsilon = \Sigma + jq\Delta$ where p and q are two mutually different real coefficients, one of which may be zero. For each recurrence of a radar-pulse transmission in a series of N such recurrences, a real component $V_{iK}$ and an imaginary component $V_{jK}$ of an angular-deviation vector V is calculated as the scalar and the vector product, respectively, of the two ancillary vectors $\gamma$ and $\epsilon$; these components are separately integrated over the N recurrences to yield two further components $W_i$ and $W_j$ whose quotient $W_j/W_i$ represents a useful angular-deviation signal.

9 Claims, 6 Drawing Figures

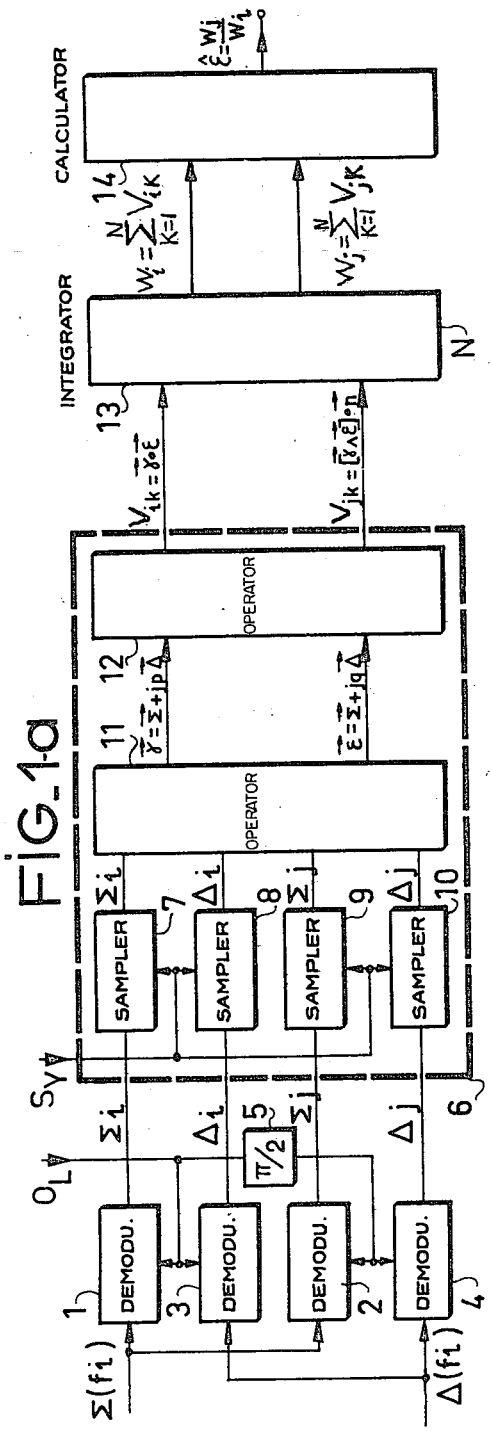
FIG_1a
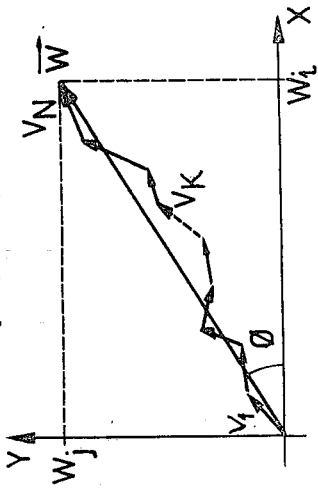
FIG_1c
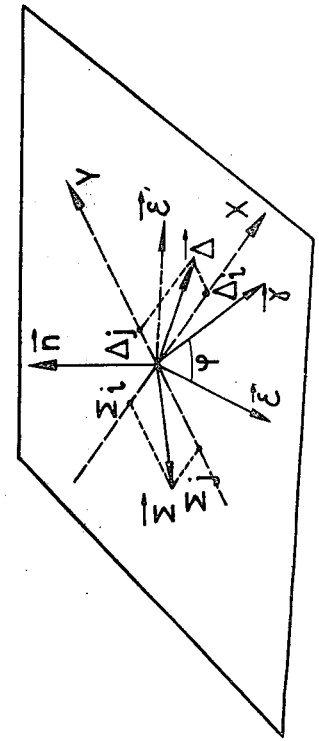
FIG_1b

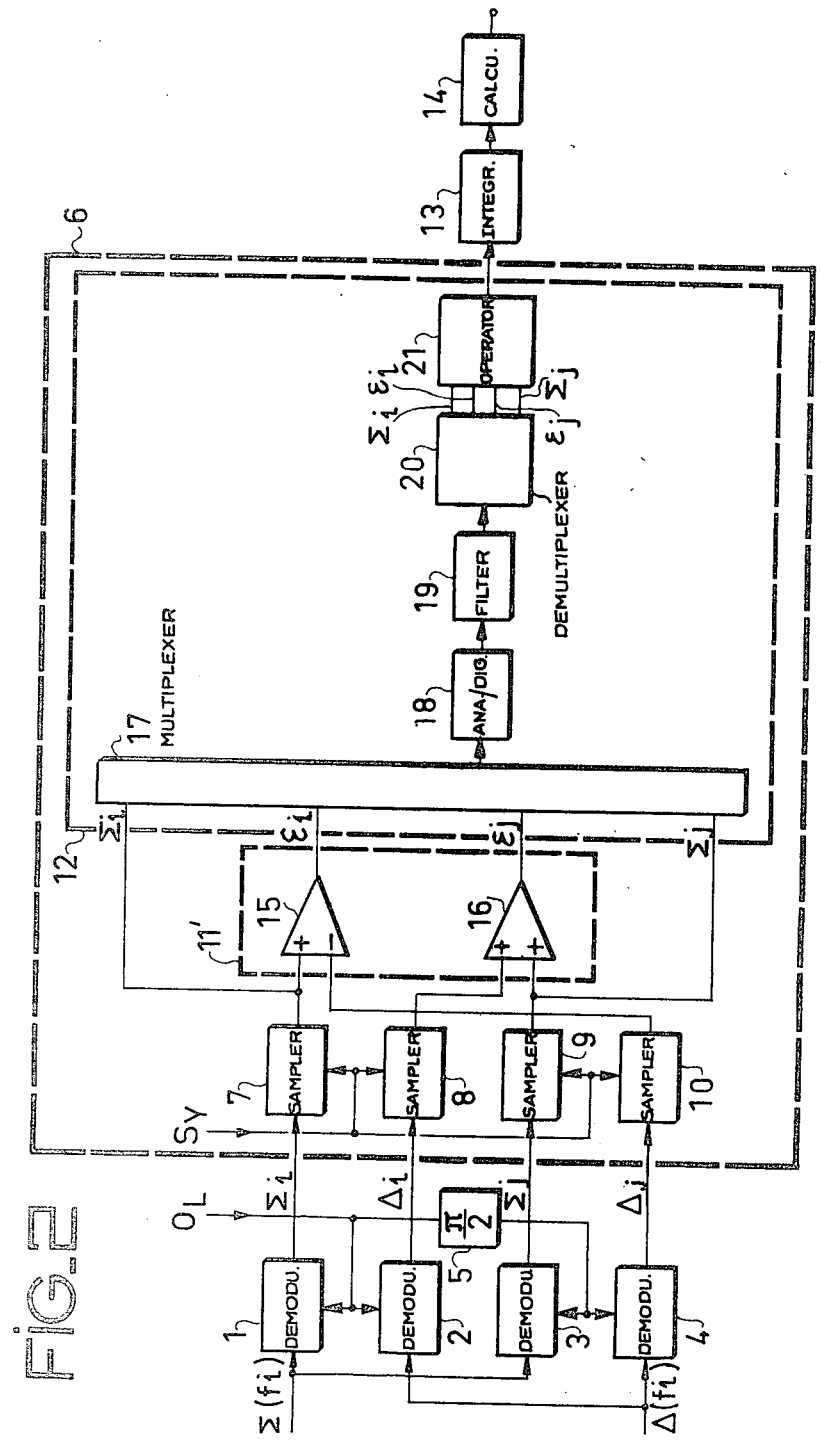

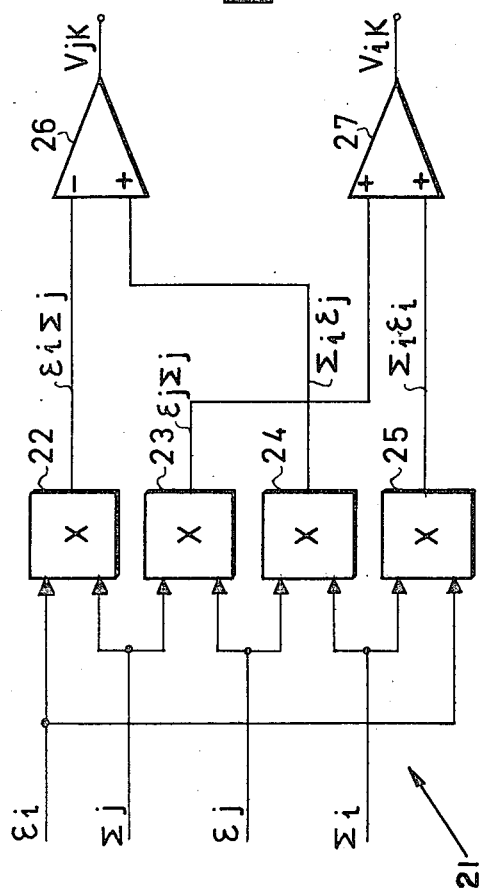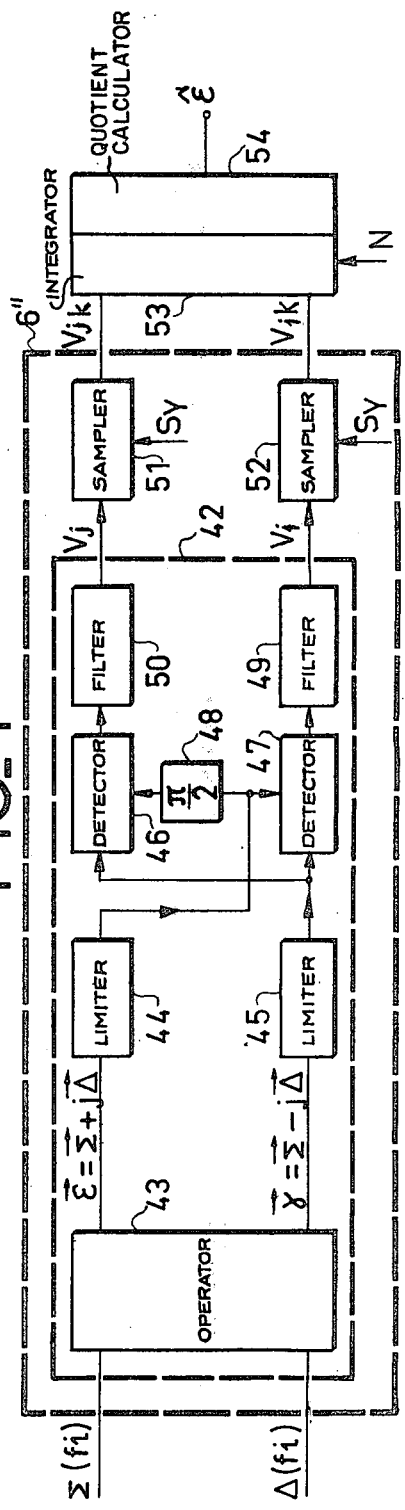

PROCESSING DEVICE FOR ANGULAR DEVIATION MEASUREMENT SIGNALS OF A MONOPULSE RADAR

FIELD OF THE INVENTION

My present invention relates to a device for the processing of echo signals of a monopulse radar to determine the angular deviation of a target direction from the so-called boresight axis of the antenna.

BACKGROUND OF THE INVENTION

In monopulse tracking radars, the measurement of the angular deviation of a target from the antenna axis is based on the comparison of a sum signal $\Sigma$ and a difference signal $\Delta$ derived from echo signals received with two separate radiation diagrams. The angular-deviation calculation is carried out by determining for each pulse transmission the ratio ($\Delta/\Sigma$) and averaging the resulting quotients over a given number of transmission recurrences. In operation, the signal is still mixed with the noise of the receiver and the calculation of the elementary angular deviation for each recurrence still suffers from errors, particularly in the case of low levels of the difference signal $\Delta$, inasmuch as the calculation of the mean value of the elementary angular deviations does not allow the result of the final calculation to be corrected in a manner taking into account the nonlinear relationship between the ratio ($\Delta/\Sigma$) (as a function of the deviation to be measured) and the signal-to-noise ratio.

In existing tracking radars, the digital processing of the angular-deviation signal entails problems linked with the choice of the number of definition bits necessary for this processing. In general terms, the sum signal $\Sigma$ has, for example, a dynamic range of about 60 dB for the ratio of the maximum to the minimum amplitude of the detected signal. The search made preceding the tracking mode of such radars necessitates, particularly for the coding, the Doppler filtering and the contrasted detection of the signal, a digital coding range of 10 amplitude bits plus one sign bit. The least-significant bit is then of the order of the minimum signal level, i.e. the thermal-noise level of the radar. However, the level of the difference signal $\Delta$ is substantially lower than the level of the sum signal $\Sigma$, particularly when, during the tracking phase, the axis of the antenna is pointed onto the target. The angular-deviation signal representative of the offset of the target from the antenna axis is then represented by the amplitude ratio of the signals $\Delta$ and $\Sigma$. An order of magnitude of the angular-deviation signal ($\Delta/\Sigma$) is $-20$ dB for a signal received from a target in line with the axis of the radar antenna.

A known procedure for the retrieval of angular-deviation signals comprises coding the difference and sum video signals $\Delta_i$ and $\Sigma_i$ or the difference and sum video signals $\Delta_j$ and $\Sigma_j$ respectively obtained by amplitude demodulation of in-phase and quadrature signals, followed by the processing of these components in a digital Doppler filter before computing the ratio ($\Delta_i/\Sigma_i$) or ($\Delta_j/\Sigma_j$) representing the angular-deviation signal for each occurrence. However, for signals $\Sigma$ close to the detection limit, i.e. for a signal-to-noise ratio close to 0 dB, the resolution threshold of the coding and the processing necessary for searching purposes is of the order of the signal level corresponding to the least-significant bit equal to the effective noise value. The resolution threshold needed for the coding of the difference signal $\Delta$ is then 15 dB lower, the coding and processing of the angular deviations therefore requiring two to three supplementary information bits.

Thus, it is not possible to use the processing circuits of the signal of the search mode for the tracking mode, more particularly the analog-digital converter and the digital Doppler filter, because the signal for the tracking mode is at a level substantially less than the level corresponding to the least-significant bit of the search coder, i.e. at a level greatly below the resolution threshold of the processing circuits of the search mode.

OBJECTS OF THE INVENTION

An object of my present invention is to provide a device of the character set forth which obviates the disadvantages referred to hereinbefore by employing an improved processing technique.

A more particular object of my invention is to provide a device permitting the coding and digital processing of sum and difference signals $\Sigma$ and $\Delta$ with the same degree of resolution while retaining after coding the same angular-deviation slope.

Another object of the present invention is to provide a device permitting the coding and processing of sum and difference signals $\Sigma$ and $\Delta$ enabling the extraction of the angular-deviation signal by arithmetic operations only, whereby processing can be carried out without degradation of the angular-deviation slope by circuits of the search mode of the radar.

SUMMARY OF THE INVENTION

The device according to my invention supplies, at least in an intermediate-frequency stage, a sum signal $\Sigma(fi)$ and a difference signal $\Delta(fi)$ carrying information about the offset of a target from the axis of the antenna in a reference plane of the latter. The relative phase of the intermediate-frequency sum and difference signals $\Sigma(fi)$ and $\Delta(fi)$, respectively, is the angle between sum and difference vectors $\vec{\Sigma}$ and $\vec{\Delta}$ in a complex plane defined by a real axis X and an imaginary axis Y. I further provide arithmetic means for calculating, for the $K^{th}$ recurrence in a series of N pulse transmissions (K being an integer ranging from 1 through N), components $V_{iK}$, $V_{jK}$ of an angular-deviation vector $\vec{V}$ in that complex plane, with real component $V_{iK}=\vec{\gamma}\cdot\vec{\epsilon}$ and imaginary component $V_{jK}=[\vec{\gamma}\times\vec{\epsilon}]\cdot\vec{n}$; the latter term is a mixed (partly vectorial, partly scalar) product of the vectors $\vec{\gamma}$, $\vec{\epsilon}$, $\vec{n}$ where $\vec{\gamma}=\vec{\epsilon}+jp\vec{\Delta}$, $\vec{\epsilon}=\vec{\Sigma}+jq\vec{\Delta}$, coefficients p and q being two mutually different real numbers, $\vec{n}$ is a unit vector orthogonal to the plane $\vec{\gamma}, \vec{\epsilon}$, and $j=\sqrt{-1}$ conventionally denotes the rotational operator of $(\pi/2)$ in the complex plane. The relative phase $\phi$ of vectors $\vec{\gamma}$ and $\vec{\epsilon}$ in the complex plane is representative of the angular-deviation measurement. Integration over N recurrences of components $V_{iK}$ and $V_{jK}$ of vector $\vec{V}$ supplies components $W_i$, $W_j$ of a vector $\vec{W}$ whose phase in the complex plane conveys the useful information about the angular deviation or offset of the target; thus, $$W_i = \sum_{K=1}^{N} V_{iK}, \quad W_j = \sum_{K=1}^{N} V_{jK}.$$

A useful angular-deviation signal $\vec{\epsilon}=W_j/W_i$ is derived from the components of vector $\vec{W}$.

Such a device can be used in any monopulse radar system, the radar being operated for either continuous or discontinuous tracking according to its search mode.

The scalar product $V_{iK}$ of vectors $\vec{\gamma}, \vec{\epsilon}$ and the mixed product $V_{jK}$ of vectors $\vec{\gamma}, \vec{\epsilon}, \vec{n}$ are respectively given by $V_{iK}=P_1P_2 \cos \phi$ and $V_{jK}=P_1P_2 \sin \phi$ where $P_1$ and $P_2$ respectively represent the moduli of vectors $\vec{\gamma}$ and $\vec{\epsilon}$. More generally, the components $V_{iK}$ and $V_{jK}$ can be defined as derived from a function f of the product of the moduli of vectors $\vec{\gamma}$ and $\vec{\epsilon}$ with $V_{iK}=f(P_1P_2) \cos \phi$ and $V_{jK}=f(P_1P_2) \sin \phi$.

BRIEF DESCRIPTION OF THE DRAWING

The above and other features of my invention will now be described in greater detail with reference to the attached drawing wherein:

FIG. 1a is a block diagram of a signal-processing device according to the invention;

FIG. 1b shows vectors $\vec{\Sigma}$ and $\vec{\Delta}$, representative of the angular-deviation information, in a complex plane X, Y;

FIG. 1c shows the components of a vector $\vec{W}$ in the complex plane;

FIG. 2 shows a digital processing device generally similar to the processor of FIG. 1;

FIG. 3 illustrates a constructional detail of the device shown in FIG. 2; and

FIG. 4 shows another processing device according to my invention in which components $V_{iK}, V_{jK}$ of an angular-deviation vector $\vec{V}$ are determined by means of analog circuits.

DETAILED DESCRIPTION

In FIG. 1a I have shown a device for processing the angular-deviation signals of a monopulse radar which, when operating at an intermediate frequency, receives a sum signal $\Sigma(fi)$ and a difference signal $\Delta(fi)$ carrying information on the offset of a target direction from the boresight axis of the radar antenna in a reference plane of the latter. The signals $\Sigma(fi)$ and $\Delta(fi)$ are received by in-phase and quadrature demodulators 1–4 supplying respective video signals $\Sigma_i, \Delta_i$ and $\Sigma_j, \Delta_j$, the signals $\Sigma_i, \Sigma_j$ and $\Delta_i, \Delta_j$ defining respective vectors $\vec{\Sigma}$ and $\vec{\Delta}$ in the complex plane X, Y as shown in FIG. 1b. The relative inclination of these vectors is due to multiple reflections at the target surface; with a punctiform target they would be colinear. According to FIG. 1a, each in-phase demodulator 1 and 3 receives at a first input the signal $\Sigma(fi)$ of $\Delta(fi)$ and at a second input a reference signal $O_L$ supplied by a local oscillator not shown; each quadrature demodulator 2 and 4 receives at a first input the signal $\Sigma(fi)$ or $\Delta(fi)$ and at a second input the reference signal $O_L$ supplied by the local oscillator via a $(\pi/2)$ phase shifter 5. The demodulators 1, 2, 3 and 4 respectively supply the signals $\Sigma_i, \Sigma_j, \Delta_i, \Delta_j$ to an arithmetic unit 6 calculating, for each recurrence of order number $K(1 \leq K \leq N)$ of an outgoing radar pulse, components $V_{iK}, V_{jK}$ of an angular-deviation vector V. Arithmetic unit 6 of FIG. 1a is shown to comprise four samplers 7, 8, 9 and 10 respectively connected to the outputs of demodulators 1, 2, 3 and 4. In operation, samplers 7, 8, 9, 10 receive at a control input a synchronous sampling command Sy from the tracking window, supplied by the radar's tracking loop (not shown) for each transmission recurrence. Samplers 7, 8, 9, 10 respectively supply the instantaneous values of signals $\Sigma_i, \Delta_i, \Sigma_j, \Delta_j$ to a first-stage operator circuit 11 which linearly combines vectors $\vec{\Sigma}$ and $\vec{\Delta}$ to produce a pair of ancillary signals representing the aforementioned vectors $\gamma = \epsilon + jp\Delta$ and $\epsilon = \Sigma + jq\Delta$ where, as already noted, p and q are real numbers with $p \neq q$. The signals representative of vectors $\vec{\gamma}$ and $\vec{\epsilon}$ are supplied to a second-stage operator circuit 12 calculating, for each $K^{th}$ recurrence, the components $V_{iK} = \gamma \cdot \epsilon$ and $V_{jK} = [\gamma \times \epsilon] \cdot n$ referred to above. According to FIG. 1b, where unit vector $\vec{n}$ is shown perpendicular to plane XY, the vectors $\vec{\gamma}$ and $\vec{\epsilon}$ include with each other a phase angle $\phi$ which is a function of the angular deviation of the target being tracked. With $P_1$ and $P_2$ respectively representing the moduli of vectors $\vec{\gamma}$ and $\vec{\epsilon}$, as stated earlier, the components of vector $\vec{V}$ along axes X and Y have the respective magnitudes $V_{iK} = P_1P_2 \cos \phi$ and $V_{jK} = P_1P_2 \sin \phi$ previously indicated. When the difference signal $\Delta$ disappears in the case of a target position on the boresight axis, vectors $\vec{\gamma}$ and $\vec{\epsilon}$ coincide so that $\phi = V_{jK} = 0$. The positions of axes X and Y in the complex plane, coinciding with the in-phase components $\Sigma_i, \Delta_i$ and quadrature components $\Sigma_j, \Delta_j$, are of course determined by the periodic reference signal $O_L$.

The two components $V_{iK}, V_{jK}$ are fed to a unit 13 for integration over N recurrences thereof. The number N of such recurrences depends on the pass band of the radar's tracking loop. The integrator 13 may be constituted by two networks, not shown individually, which respectively ensure a separate integration of each component. The integration over N recurrences produces components $$W_i = \sum_{K=1}^{N} V_{iK} \text{ and } W_j = \sum_{K=1}^{N} V_{jK}$$

of a vector $\vec{W}$ whose phase $\phi$ in the complex plane represents a smoothed angular-deviation indicator whose mean value is much less dependent on the signal-to-noise ratio than in prior-art systems. The signals representative of components $W_i$ and $W_j$ of vector W, shown in FIG. 1c, are supplied to a calculator 14 determining their quotient to provide a useful angular-deviation signal $\hat{\epsilon} = W_j/W_i$. In FIG. 1c I have also indicated first, intermediate and final samples $V_1, V_K$ and $V_N$ of vector $\vec{V}$.

Elements 11–14 can be constituted by analog or by digital processing circuits. The processing operations involved, including trigonometrical calculations for determining the relative phase $\phi$ of the ancillary vectors $\vec{\gamma}$ and $\vec{\epsilon}$, are difficult to perform in a continuous manner.

According to FIG. 2, a device similar to that of FIG. 1a comprises a digital processor performing only arithmetic operations. Such processing is made possible by the choice of coefficients $p = 0$ and $q = 1$ whereby $\vec{\gamma} = \vec{\Sigma}$ and $\vec{\epsilon} = \vec{\Sigma} + j\vec{\Delta}$. A modified arithmetic unit 6' includes an operator circuit 11' for synthesizing the ancillary vector $\vec{\epsilon}$ which comprises analog calculating circuitry for generating, with each $K^{th}$ recurrence of pulse transmission, components $\epsilon_i, \epsilon_j$ of vector $\vec{\epsilon} = \vec{\Sigma} + j\vec{\Delta}$, these components being respectively given by $\epsilon_i = \Sigma_i - \Delta_j$ and $\epsilon_j = \Sigma_j + \Delta_i$. To this end, the linearly combining operator circuit 11' comprises two algebraic adders 15 and 16. Adder 15 receives at a first, positive input the sampled values of signal $\Sigma_i$ and at a second, negative input the sampled values of signal $\Delta_j$. Adder 16 receives at a first, positive input the sampled values of signal $\Delta_i$ and at a second, positive input the sampled values of signal $\Delta_j$. Adders 15 and 16 thus respectively supply the components $\epsilon_i$ and $\epsilon_j$ of vector $\vec{\epsilon}$ whereas components $\Sigma_i$ and $\Sigma_j$ are directly available at the outputs of samplers 7 and 9.

Components $V_{iK}, V_{jK}$ of vector $\vec{V}$ can also be written:

$$V_{iK} = \vec{\Sigma} \cdot \vec{\epsilon} = \Sigma_i \epsilon_i + \Sigma_j \epsilon_j \text{ and}$$

$$V_{jK} = [\vec{\Sigma} \times \vec{\epsilon}] \cdot \vec{n} = \Sigma_i \epsilon_j - \Sigma_j \epsilon_i.$$

The signals representing components $\Sigma_i$, $\epsilon_i$, $\epsilon_j$, $\Sigma_j$ are supplied to the second-stage operator circuit 12, calculating the angular-deviation vector $\vec{V}$, which includes an analog multiplexer 17 permitting the parallel-series transmission of these signals to an analog/digital converter 18. After coding into digital signals, the converter 18 transmits the values of the components of vectors $\vec{\epsilon}$ and $\vec{\Sigma}$ to a Doppler filter 19. The converter 18 and the Doppler filter 19 are preferably the same circuits that are used in the search mode of the radar, the coding and Doppler processing of the four components $\Sigma_i$, $\Sigma_j$, $\epsilon_i$, $\epsilon_j$ being carried out by them at the end of the pulse-transmission recurrence. The output signals of the Doppler filter 19 are in turn transmitted to a digital demultiplexer 20 supplying signals $\Sigma_i$, $\epsilon_i$, $\Sigma_j$, $\epsilon_j$ to a digital operator circuit 21. The analog multiplexer 17 and the digital demultiplexer 20 need not be described because they are well known in the art.

A preferred embodiment of digital operator 21 is shown in FIG. 3 and comprises four multipliers 22, 23, 24, 25 respectively receiving digitized signal pairs representative of the components $\epsilon_i$ and $\Sigma_j$, $\Sigma_j$ and $\epsilon_j$, $\epsilon_j$ and $\Sigma_i$, $\Sigma_i$ and $\epsilon_i$. The multipliers supply the corresponding cross-products $\epsilon_i\Sigma_j$, $\epsilon_j\Sigma_j$, $\Sigma_i\epsilon_j$ and $\Sigma_i\epsilon_i$. The signals representing the cross-products $\epsilon_i\Sigma_j$ and $\Sigma_i\epsilon_j$ are respectively fed to a negative input and a positive input of a first adder 26 whereas the signals representing the products $\epsilon_j\Sigma_j$ and $\epsilon_i\Sigma_i$ are respectively fed to a first positive input and a second positive input of a second adder 27. Adders 26 and 27 respectively generate the components $V_{jK}$, $V_{iK}$ of angular-deviation vector $\vec{V}$. The embodiment of FIG. 3 may be replaced by any sequential circuit arrangement in which a smaller number of multipliers is used for obtaining products of paired components, possibly in combination with a different number of adders designed to produce components $V_{iK}$ and $V_{jK}$. The integrator 13 operating on N recurrences of these components of vector $\vec{V}$ may be of digital type preset to the number N which, as stated above, depends on the pass band of the tracking loop of the radar. By way of example, number N may be chosen equal to or greater than 20; however, an increase of N above 20 has little influence on the performance of the system for a given signal-to-noise ratio and for a given coding step in which the least-significant bit is equal to the effective value of the noise. The unit 14 computing the useful angular-deviation signal $\hat{\epsilon}$ given by the quotient $W_j/W_i$ of the components of vector $\vec{W}$ can be constituted by any digital calculating system and in particular by the radar computer, which is able to carry out the calculations with the desired accuracy.

The embodiment of my invention shown in FIG. 4 comprises a device in which the signals defining vectors $\vec{\Sigma}$ and $\vec{\Delta}$ are processed by analog circuitry with coefficients p and q having the values −1 and +1 respectively. The ancillary vectors $\vec{\gamma}$ and $\vec{\epsilon}$ obtained by linear combination are thus defined by the relationships $\vec{\gamma} = \vec{\Sigma} - j\vec{\Delta}$ and $\vec{\epsilon} = \vec{\Sigma} + j\vec{\Delta}$. The arithmetic unit 6" of FIG. 4 calculating vector components $V_{iK}$ and $V_{jK}$ generates signals $V_i = \cos\phi$ and $V_j = \sin\phi$ where $\phi$ again represents the phase angle between vectors $\vec{\epsilon}$ and $\vec{\gamma}$. The analog circuitry 42 of unit 6" comprises an analog operator circuit 43 receiving intermediate-frequency signals $\Sigma(fi)$ and $\Delta(fi)$ and supplying on two output channels the signals representing ancillary vectors $\vec{\epsilon} = \vec{\Sigma} + j\vec{\Delta}$ and $\vec{\gamma} = \vec{\Sigma} - j\vec{\Delta}$ which are fed via amplitude limiters 44, 45 to a first and a second phase-amplitude detector 46, 47; the connection between limiter 44 and detector 46 includes a $(\pi/2)$ phase shifter 48. Detectors 46, 47 respectively supply the aforementioned trigonometric signals $V_i = \cos\phi$ and $V_j = \sin\phi$. The limiters 44, 45 emit signals of unity amplitude whereby the output signals of detectors 46 and 47 are in fact representative of the cosine and the sine of the phase angle $\phi$ between vectors $\gamma$ and $\epsilon$. Thus, the output signals $V_i$ and $V_j$ at phase-amplitude detectors 47, 46 are respectively proportional to the scalar product of vectors $\vec{\gamma}$ and $\vec{\epsilon}'$ where $\epsilon'$ is the vector obtained in the complex plane by a $(\pi/2)$ rotation of vector $\epsilon$ (FIG. 1b). It will be readily apparent that the scalar product $\gamma \cdot \epsilon'$ is equivalent to the vector product $[\vec{\gamma} \times \vec{\epsilon}]$ and therefore to the mixed product $[\vec{\gamma} \times \vec{\epsilon}] \cdot \vec{n}$, discussed with reference to FIG. 1b, when both ancillary vectors $\vec{\gamma}$, $\vec{\epsilon}$ have unity amplitude. Signals $V_i$ and $V_j$ are delivered via low-pass filters 49 and 50 to samplers 52 and 51, respectively, controlled by the synchronizing command Sy. The resulting samples $V_{iK}$, $V_{jK}$ undergo separate integration in a circuit 53 which supplies the components $W_i$ and $W_j$ of vector $\vec{W}$ to a circuit 54 calculating the quotient of these components. Circuits 53 and 54, operating at a frequency (FR/N) where FR is the recurrence frequency of the outgoing radar pulses, can be constituted by any integrator and analog calculator capable of operating at this frequency. The operator 43 linearly combining the vectors $\vec{\Sigma}$ and $\vec{\Delta}$ can be constituted by any known circuit which is able to supply the sum and the difference of the in-phase and quadrature carrier waves. In particular, this operator circuit can be of the type described in commonly owned U.S. Pat. No. 4,220,953.

The use of digital processing has the advantage, compared with analog processing, that fixed echoes can be directly eliminated by a Doppler filtering of the signal.

The device according to my invention can also be used, particularly in the case of digital processing, with a tracking radar system using discontinuous information in which the antenna permanently scans at a constant angular velocity and in which the signal measuring angular azimuthal deviation is sampled when the antenna axis coincides with the direction of the target during movement of the antenna past a selection window bracketing a reference azimuth model. Therefore, the difference signal varies constantly during this measurement. In this case, the number N of recurrences during which the circuit 13 (or 53) integrates the components $V_{iK}$ and $V_{jK}$ of the angular-deviation vector $\vec{V}$ is determined by the time during which the antenna beam sweeps over the target. The number N is then given by the relationship $N = FR(\theta/\Omega)$ where $\theta$ is the antenna beam angle, FR is the aforementioned recurrence frequency of the radar and $\Omega$ the rotational speed of the antenna. When the number N is determined in the manner described hereinbefore, the operation of the device is the same as with continuous tracking.

I claim:

1. A device for processing intermediate-frequency sum signals $\Sigma(fi)$ and difference signals $\Delta(fi)$, derived from echo signals reflected by a target tracked by a monopulse radar, in order to determine the angular offset of the target position from the boresight axis of a radar antenna transmitting recurrent outgoing pulses toward the target, comprising:

arithmetic means for generating from said sum and difference signals $\Sigma(fi)$ and $\Delta(fi)$, for each recurrence of an outgoing-pulse transmission in a series of N such recurrences, a real component $V_{iK}$ and an imaginary component $V_{jK}$ of an angular-deviation vector $\vec{V}$ in a complex plane, K being an integer ranging from 1 through N, with component $V_{iK}$ defined as the scalar product and component $V_{jK}$ defined as the vector product of two ancillary vectors $\vec{\gamma}=\vec{\Sigma}+jp\vec{\Delta}$ and $\vec{\epsilon}=\vec{\Sigma}+jq\vec{\Delta}$, p and q being two mutually different real coefficients not more than one of which can be zero, $\vec{\Sigma}$ and $\vec{\Delta}$ being a sum vector and a difference vector in said complex plane with in-phase and quadrature components $\Sigma_i$, $\Delta_i$ and $\Sigma_j$, $\Delta_j$ determined by a periodic reference signal;

integration means connected to said arithmetic means for separately integrating said components $V_{iK}$ and $V_{jK}$ over N recurrences to produce a pair of components $W_i$ and $W_j$ of a further vector W in said complex plane; and calculating means connected to said integration means for computing the quotient $W_j/W_i$ of said pair of components as a useful angular-deviation signal.

2. A device as defined in claim 1 wherein said arithmetic means includes four samplers with inputs connected to demodulators controlled by said reference signal for respectively receiving said in-phase and quadrature components $\Sigma_i$, $\Delta_i$ and $\Sigma_j$, $\Delta_j$, said samplers being timed by a synchronous command from a tracking loop of the radar for emitting instantaneous values of said in-phase and quadrature components during each of said recurrences, and operating circuitry inserted between said samplers and said integration means for deriving signals representative of said ancillary vectors $\vec{\gamma}$ and $\vec{\epsilon}$ from said instantaneous values and converting said representative signals into said real and imaginary components $V_{iK}$ and $V_{jK}$.

3. A device as defined in claim 2 wherein said operating circuitry comprises algebraic means feeding components $\gamma_i$, $\gamma_j$ and $\epsilon_i$, $\epsilon_j$ of said ancillary vectors $\vec{\gamma}$ and $\vec{\epsilon}$ to an analog/digital converter, a Doppler filter receiving said components $\gamma_i$, $\gamma_j$, $\epsilon_i$, $\epsilon_j$ in digitized form from said converter, and a digital operator connected to said Doppler filter for generating said components $V_{iK}$ and $V_{jK}$ from the digitized and filtered components $\gamma_i$, $\gamma_j$, $\epsilon_i$, $\epsilon_j$.

4. A device as defined in claim 3 wherein, with $p=0$ and $\vec{\gamma}=\vec{\Sigma}$, said algebraic means comprises two adders each having two inputs connected to a respective pair of said samplers for generating said components $\epsilon_i$ and $\epsilon_j$ and feeding same to said converter, the latter also receiving components $\Sigma_i$ and $\Sigma_j$ directly from two of said samplers.

5. A device as defined in claim 3 or 4 wherein said operating circuitry further includes an analog multiplexer upstream of said analog/digital converter for serializing the components to be digitized, and a digital demultiplexer inserted between said Doppler filter and said digital operator for parallelizing the digitized and filtered components.

6. A device as defined in claim 3 or 4 wherein said digital operator comprises four multipliers respectively forming cross-products $\epsilon_i \gamma_j$, $\epsilon_j \gamma_j$, $\gamma_i \epsilon_j$ and $\gamma_i \epsilon_i$, a first adder connected to two of said multipliers for differentially combining the cross-products $\epsilon_j \gamma_j$ and $\gamma_i \epsilon_i$ to form said real component $V_{iK}$, and a second adder connected to the remaining two multipliers for summing the cross-products $\epsilon_i \gamma_j$ and $\gamma_i \epsilon_j$ to form said imaginary component $V_{jK}$.

7. A device as defined in claim 1 wherein said arithmetic means comprises operating circuitry receiving said sum and difference signals $\Sigma(fi)$ and $\Delta(fi)$ and deriving therefrom two trigonometric signals $V_i$ and $V_j$ respectively proportional to the cosine and the sine of the angle included in said complex plane between said ancillary vectors $\vec{\gamma}$ and $\vec{\epsilon}$, and two samplers connected to respective outputs of said operating circuitry for receiving said trigonometric signals therefrom, said samplers being timed by a synchronous command from a tracking loop of the radar for emitting said real and imaginary components $V_{iK}$ and $V_{jK}$ during each of said recurrences.

8. A device as defined in claim 7 wherein said operating circuitry includes an analog operator synthesizing signals representative of said ancillary vectors $\vec{\gamma}$ and $\vec{\epsilon}$ with coefficients p and q thereof having the same magnitude and opposite sign, two limiters connected to respective outputs of said analog operator for establishing a predetermined unit amplitude for said representative signals, and two phase-amplitude detectors each having two inputs respectively connected to both limiters with interposition of a 90° phase shifter between one of said limiters and one of said detectors whereby said trigonometric signals $V_i$ and $V_j$ are generated.

9. A device as defined in claim 8, further comprising a pair of low-pass filters respectively inserted between said detectors and said samplers.

* * * * *